UNITED STATES PATENT OFFICE.

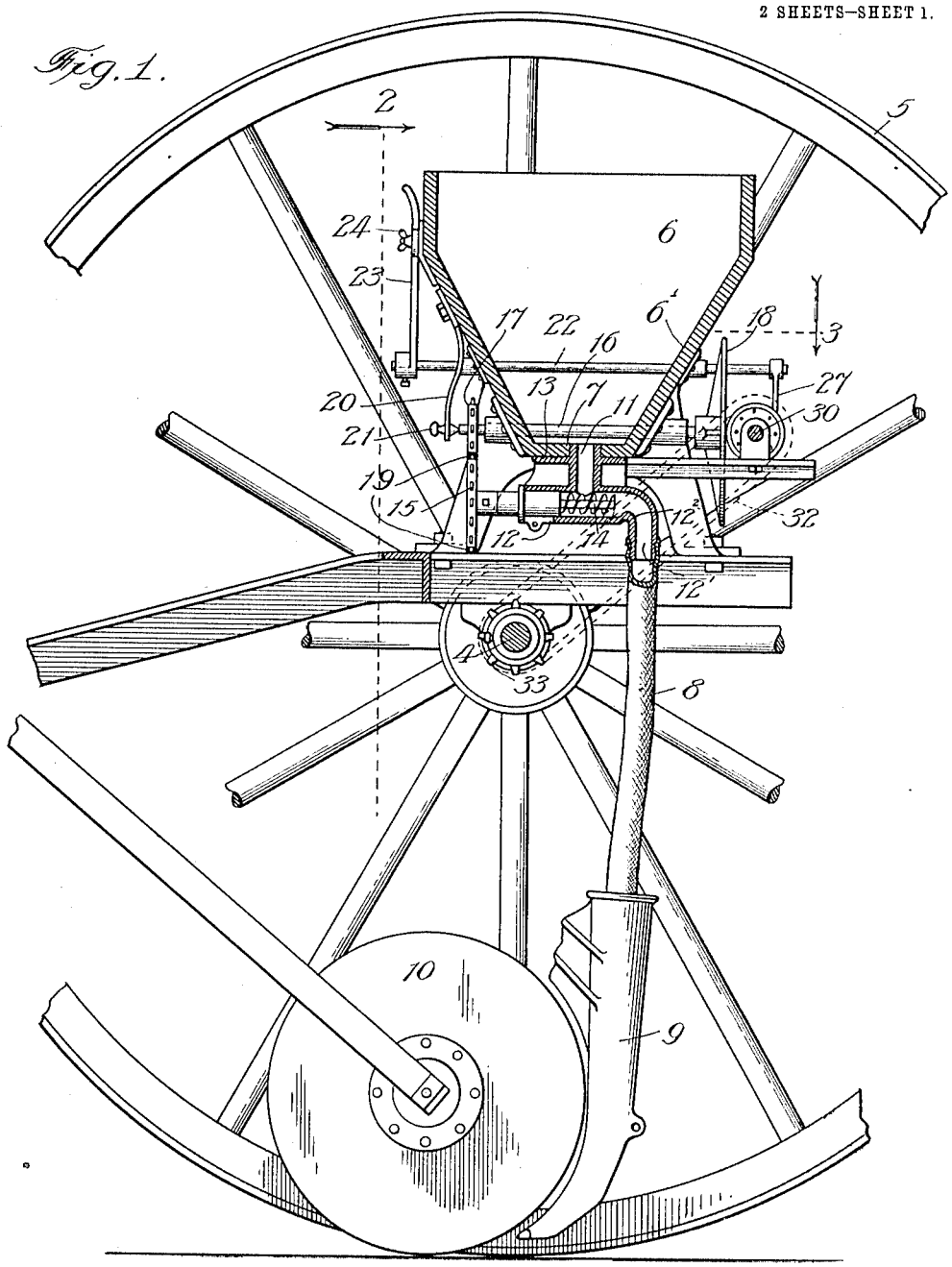

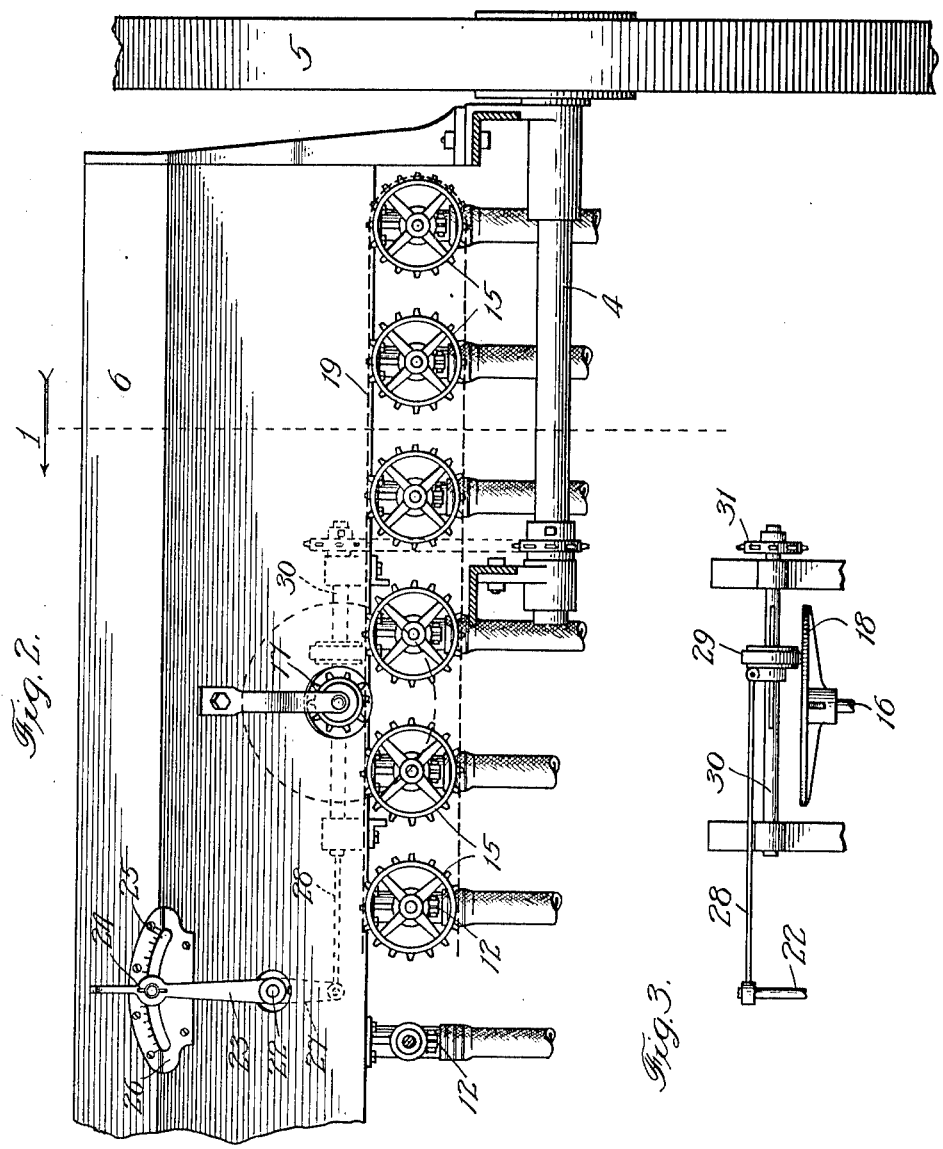

HARRY C. WAITE, OF LEWISTOWN, MONTANA.

GRAIN-DRILL.

1,073,826.  Specification of Letters Patent.  Patented Sept. 23, 1913.

Application filed February 12, 1912. Serial No. 677,069.

*To all whom it may concern:*

Be it known that I, HARRY C. WAITE, a citizen of the United States, residing at Lewistown, in the county of Fergus and State of Montana, have invented a new and useful Improvement in Grain-Drills, of which the following is a specification.

The object of my invention is to improve the operation of a grain-drill by enabling the feed of grain from the supply-box or hopper on the vehicle to the shoe to be arrested, expedited and retarded, thereby to render the sowing of the grain controllable and uniform; and my invention consists in means which I have devised for these various purposes in a grain-drill.

In the accompanying drawing, Figure 1 is a broken section on line 1, Fig. 2, of a grain-drill provided with my improvements; Fig. 2 is a section on line 2, Fig. 1, and Fig. 3 is a section on line 3, Fig. 1.

Only so much of a known type of grain-drill is illustrated in the drawings as is necessary to enable my improvements to be readily understood from the description hereinafter contained.

The axle 4, which is usually divided, carries on its opposite ends the vehicle-wheels, like that shown at 5; and the body of the vehicle is a box 6 for holding the supply of seed-grain, having a hopper-like bottom 6¹ provided centrally of its base with a longitudinal series of outlet-openings 7, each equipped with a discharge-spout connected by a section of hose 8 with a shoe 9 depending behind a disk 10. A vertical discharge-spout 11 at each opening 7 is formed with a transverse tubular head 12 on its lower end, having a depending end-section 12¹ to which the hose 8 is attached and at the entrance to which is formed a constriction 12² to afford a dam against the grain being shaken out; and the spout is provided with a flange 13 to fit against the base of the hopper 6. In the head 12 is journaled a conveyer 14, of the preferred worm-type shown, extending across the spout-outlet into the head to shut off the discharge of grain when the conveyer is stationary, and when in motion to feed the grain regularly to the head-section 12¹. The conveyer-shaft carries on one end a sprocket 15. A shaft 16 is journaled in the sides of the lower part of the hopper 6 and carries on one end a sprocket 17 and on its opposite end a friction-disk 18. The series of sprockets 15 are connected by a chain 19 driven by engagement with it of the sprocket 17. The shaft 16, which is longitudinally shiftable in its bearings for the purpose hereinafter explained, is pressed at one end by a stiff spring 20 fastened to a side of the hopper 6 and carrying on its lower end a pointed head 21 to bear against the shaft-end. The fastening of this spring, as by a bolt, is such as to adapt it to be firmly secured in position to press the shaft and to be loosened and turned out of alinement therewith. A rock-shaft 22 is journaled in bearings in the sides of the hopper 6 to extend parallel with the shaft and to one side of the latter in a higher plane; and it carries on one end an operating handle 23 adjustably fastened near its upper end by a wing-nut 24 on a bolt working in the segmental slot 25 of a gage-head 26 on the corresponding side of the seed-hopper. The opposite end of this shaft carries a crank-arm 27 connected with one end of a shifting-rod 28, the opposite end of which is connected with a friction-wheel 29 feathered on a shaft 30 journaled in suitable bearings to extend at right-angles to the shaft 16 and adapt the wheel 29 to engage frictionally with the opposing face of the disk 18; and the shaft 30 carries on its outer end a sprocket 31 connected by a chain 32 with a sprocket 33 on the vehicle-axle 4.

With the grain-drill in operation, rotation of the axle rotates the wheel 29 against the disk 18, thereby driving the shaft 16 to rotate the series of conveyers 14, which thus feed the grain that comes to them by gravity from the hopper 6, uniformly through the heads 12 to the devices 9. When the machine stops, rotation of the conveyers ceases and their feeding action is discontinued. Thus they act as valves or stoppers for the spouts 11 to shut off the passage of grain through them, thereby preventing waste and improper sowing. This same result may be produced at any time, as in cases of emergency, by turning to one side the spring 20 to disengage the head 21 from the shaft 16, since then the disk 18 will yield to the pressure of the wheel 29 against it and the shaft 16 will therefore not be revolved. To change the speed of the feeding action of the conveyers, the lever 23 is turned to rock the shaft 22 and thereby shift the wheel 29, according to desire, relative to the center of the disk 18.

I realize that considerable variation is possible in the details of construction thus specifically shown and described, and I do not intend by illustrating a single, specific, or preferred form to limit my invention thereto; my intention being in the appended claims to claim protection upon all the novelty there may be in the device as broadly as the state of the art will permit.

What I claim as new and desire to secure by Letters Patent is—

1. In a grain-drill, the combination with the hopper having a longitudinal series of bottom outlets, of discharge-spouts at said outlets, stopper-forming and grain-feeding worm-conveyers in the spouts carrying chain-connected sprockets, a shaft journaled in said hopper and carrying on one end a sprocket engaging said chain, a friction-disk on the opposite end of said shaft, and a friction-wheel supported to engage the face of said disk and geared to the axle of the grain-drill to be driven thereby.

2. In a grain-drill, the combination with the hopper having a longitudinal series of bottom outlets, of discharge-spouts at said outlets, stopper-forming and grain-feeding worm-conveyers in the spouts carrying chain-connected sprockets, a shaft journaled in said hopper and longitudinally movable in its bearings, a sprocket on one end of the shaft engaging said chain and a friction-disk on the opposite end thereof, a friction-wheel supported to engage the face of said disk and geared to the axle of the grain-drill to be driven thereby, and a spring pressing against the shaft to force said disk against said wheel.

3. In a grain-drill, the combination with the hopper having a longitudinal series of bottom outlets, of discharge-spouts at said outlets, stopper-forming and grain-feeding screw-conveyers in the spouts carrying chain-connected sprockets, a shaft journaled in said hopper and longitudinally movable in its bearings, a sprocket on one end of the shaft engaging said chain and a friction-disk on the opposite end thereof, a friction-wheel supported to engage the face of said disk and geared to the axle of the grain-drill to be driven thereby, and a spring adjustably fastened to the box and provided with a head to bear against the adjacent end of the shaft and force said disk against said wheel.

4. In a grain-drill, the combination with the hopper having a longitudinal series of bottom outlets, of discharge-spouts at said outlets, stopper-forming and grain-feeding worm-conveyers in the spouts, a shaft journaled on said hopper and geared to said conveyers, a friction-disk on said shaft, a second shaft journaled to extend at right-angles to said first-named shaft and geared to the axle of the grain-drill to be driven thereby, a friction-wheel feathered on said second shaft to be adjustable longitudinally thereof and engage the face of said disk, a rock-shaft journaled in the hopper, having a crank-arm connected with said wheel to adjust it relative to the center of said face, an operating handle on the rock-shaft, and a gage-head provided with means for releasably fastening thereto said handle.

HARRY C. WAITE.

In presence of—
 L. HEISLAR,
 R. SCHAEFER.

---

Copies of this patent may be obtained for five cents each, by addressing the "Commissioner of Patents, Washington, D. C."